Figure 1:
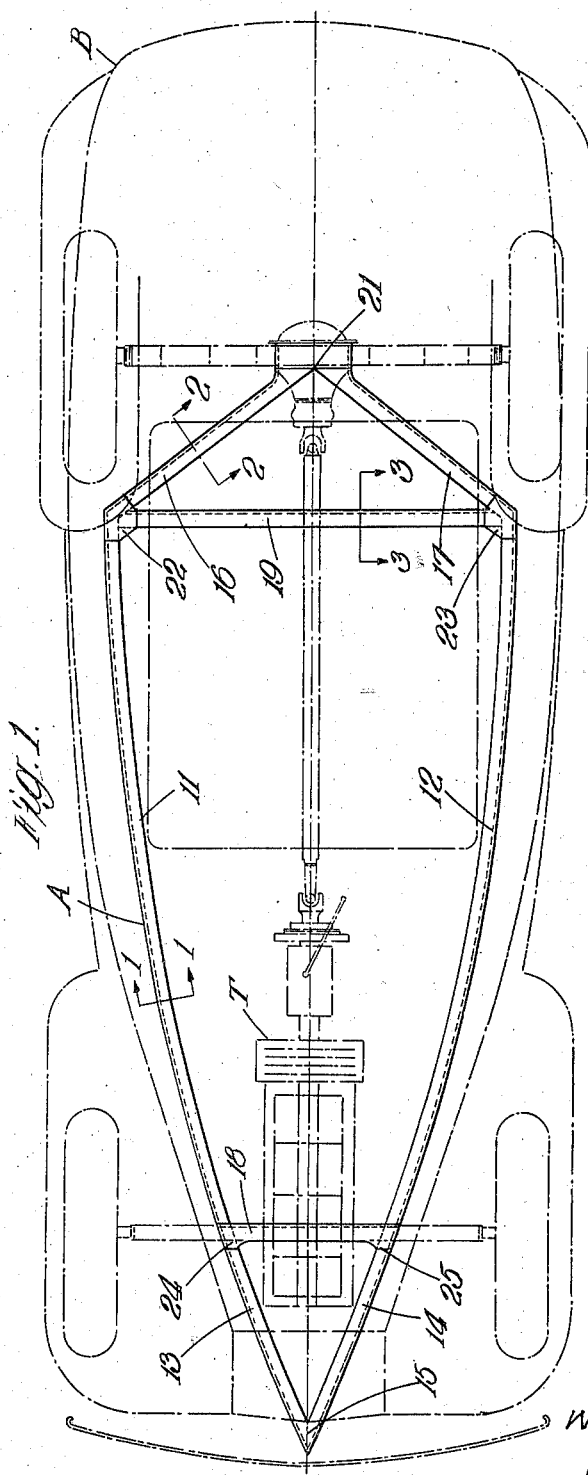

Jan. 10, 1939.  W. SWALLOW  2,143,666
VEHICLE CHASSIS FRAME
Filed July 15, 1936  4 Sheets-Sheet 1

INVENTOR
William Swallow
Attorney

Jan. 10, 1939.  W. SWALLOW  2,143,666
VEHICLE CHASSIS FRAME
Filed July 15, 1936   4 Sheets-Sheet 2

INVENTOR
William Swallow
Attorney

Jan. 10, 1939.  W. SWALLOW  2,143,666
VEHICLE CHASSIS FRAME
Filed July 15, 1936   4 Sheets-Sheet 3
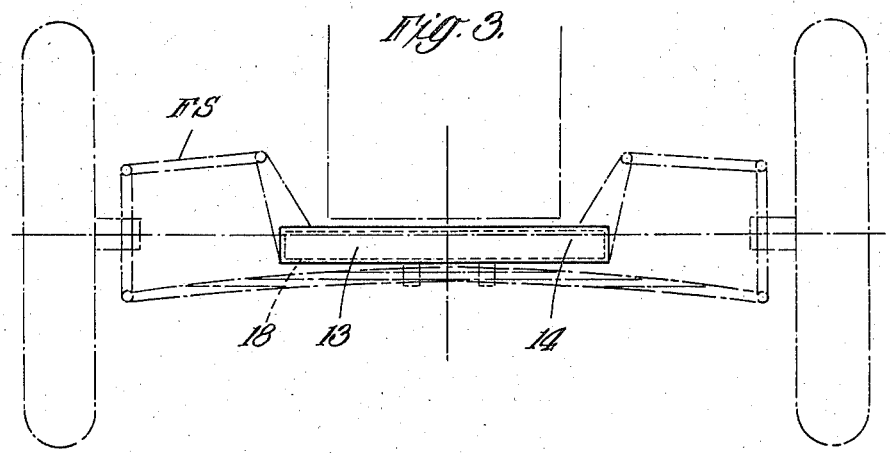
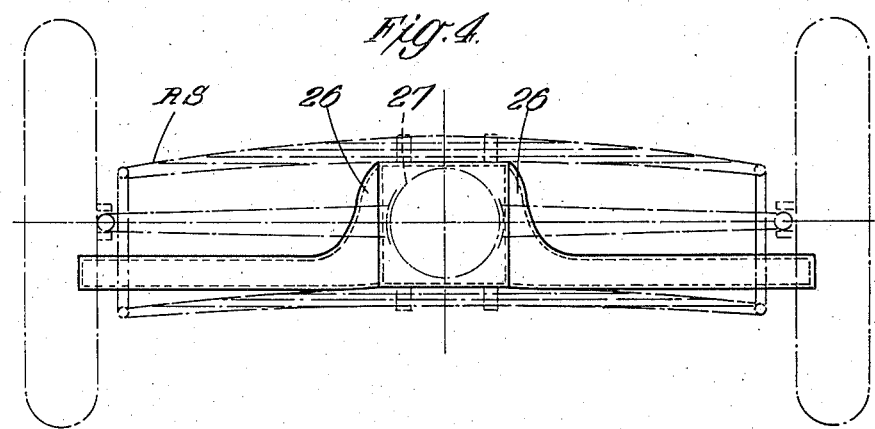
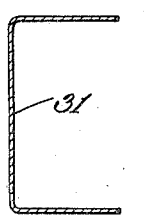 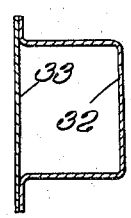 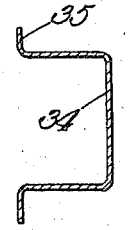  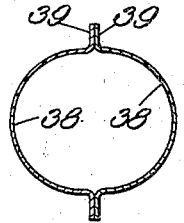
INVENTOR
William Swallow
Attorney Jan. 10, 1939.    W. SWALLOW    2,143,666
VEHICLE CHASSIS FRAME
Filed July 15, 1936    4 Sheets-Sheet 4

INVENTOR
William Swallow
Attorney

Patented Jan. 10, 1939

2,143,666

UNITED STATES PATENT OFFICE 2,143,666

VEHICLE CHASSIS FRAME

William Swallow, Headington, Oxford, England, assignor to Pressed Steel Company Limited, Oxford, England, a British company Application July 15, 1936, Serial No. 90,710
In Great Britain July 19, 1935

2 Claims. (Cl. 280—106)

This invention relates to chassis frames for vehicles or underframe structures for so-called self-supporting vehicle bodies and, although not limited thereto, concerns particularly chassis frames or underframes for vehicles wherein independent wheel supension is employed.

With independent wheel suspension it is necessary to provide a strong structure centrally of the vehicle to which the suspension can be readily anchored, and this has led to the development of the so-called back bone type chassis frame which extends centrally of the vehicle and provides such ready fixing means for the suspension. With such centre back bone type chassis frames it is generally necessary to provide transverse cantilever extensions to carry the body and this is found to result, in the complete vehicle, of undesirable roll of the body on its chassis.

It is believed that the best results will be obtained in the case of independent wheel suspension systems where the body is mounted directly on its chassis frame or substantially so, or in other words, where the chassis frame conforms as nearly as possible to the outer contour of the body, but with chassis frames of orthodox form, so conforming to the contour of the body, difficulty is experienced in mounting the independent wheel suspension systems as an auxiliary central mounting structure must be provided and the rearward and forward more or less straight through extensions of the chassis frame side members are found to interfere, to a certain extent, with the free movement of the independent wheel suspensions, particularly where the independent suspension systems are arranged in a transverse geometric or polygonal form.

The object of the present invention is to provide a chassis frame which has the advantages of the orthodox frame as regards body mounting and avoids the disadvantages of the orthodox frame as regards the independent wheel suspension systems.

According to the present invention a chassis frame or underframe for vehicles is comprised of side frame members so contoured at their forward and rear ends as to meet in a plane passing substantially through the median longitudinal plane of the vehicle. Preferably the side frame members of the chassis are arranged to support the side sills of the body and at their front and rear ends are directed to a common junction, the inwardly directed portions forming with transverse bracing members triangulated structures at the front and rear of the chassis, the inturned portions of the side frames of the chassis leaving clear spaces for the accommodation of the independent wheel suspension systems. The strength and stiffness of the chassis is increased by the forward and rearward triangulated form.

In this construction it will be clear that the body will be mounted on the chassis over those portions only of the side frames thereof which are spaced from the centre line of the vehicle and the tonneau section of the body will overhang rearwardly of the chassis although it might well be further secured at the rearward junction of the chassis side frame members.

The side frame members of the chassis may be of channel section inturned or out-turned, may be tubular, may be of built up box-section members, or may be built up of pressed sheet metal stampings, whilst the triangulated portions of the chassis frame may be of simple channel section without sacrifice of stiffness and strength which is imparted by the triangulated structure itself.

The junction of the side frame members at the rear of the chassis frame may be formed to house the usual driving mechanism and also to serve as an anchorage structure for the independent rear wheel suspension system, whilst at the front end of the chassis frame the inturned portions may serve as a cradle to support the motor and be provided with a transverse bracing member to which the independent front wheel suspension system may be anchored.

Figure 2:
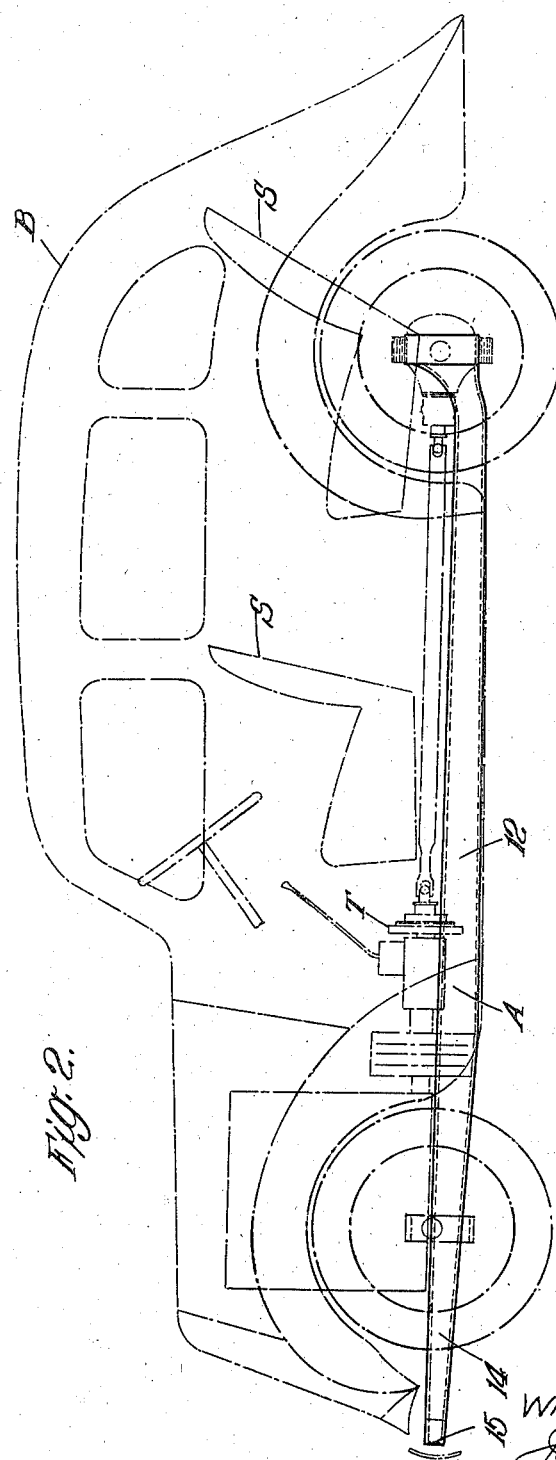
Figure 6A:
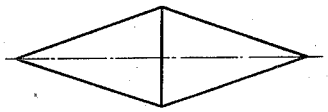
Figure 6B:
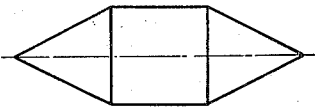
Figure 6C:
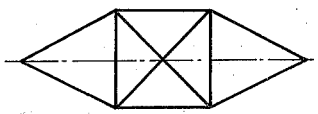
Figure 6D:
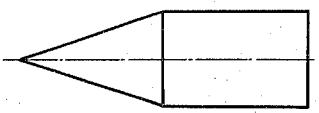
Figure 6F:
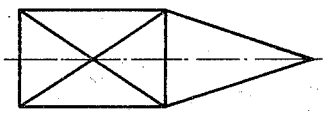
Figure 6E:
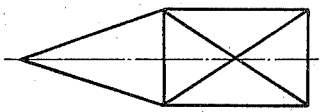
Figure 6G:
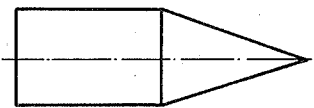
Figure 6H:
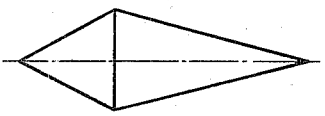
Figure 6I:
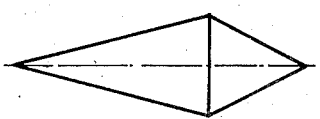
Figure 6J:
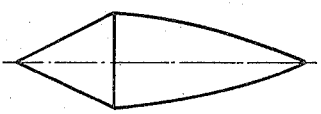
Figure 6K:
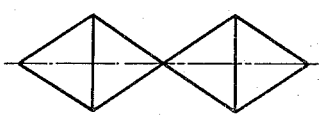

The invention is illustrated by way of example in the accompanying drawings, of which Figure 1 is a plan view of a chassis frame, the body of the vehicle being indicated by dot and dash lines. Figure 2 is a side elevation, Figures 3 and 4 are respectively front and rear end views of the chassis frame in which the method of suspension is indicated more or less diagrammatically by dot and dash lines, Figures 5a—5e show, to an enlarged scale, several modifications of sections of the chassis frame members, for example, taken on the lines 1—1, 2—2 and 3—3 of Figure 1 and Figures 6a—6k show diagrammatically several forms of chassis frame.

In Figures 1 and 2 the chassis frame is designated generally by the letter A and the body by the letter B.

The chassis frame is comprised of longitudinal side members 11 and 12, at their forward ends 13 and 14 contoured to approach each other and to meet at a point 15 in the median plane of the chassis, whilst their rearward ends have inwardly directed extensions 16 and 17 meeting at a point 21 similarly lying in a median plane of the chassis frame, transverse bracing members 18 and 19 being provided forwardly and rearwardly of the chassis. Plates 22, 23 unite the transverse member 19 with the side longitudinals 11 and 12 in the regions where they turn inwardly towards the rear of the chassis frame, whilst the transverse member 18 towards the front of the chassis frame is formed with extension pieces 24, 25 for securement to the longitudinal side members 11 and 12.

The transmission mechanism designated generally by the letter T is indicated schematically by the dot and dash lines in Figure 1, whilst the seats designated by the letter S (Figure 2) are shown schematically, similarly.

The front wheel independent suspension system designated by letters FS, and shown schematically by dot and dash lines in Figure 3, is anchored to the chassis frame in the region of the transverse bracing member 18.

At the rear end of the chassis frame, as shown in Figure 4, the inwardly directed frame members 16 and 17 are formed with enlarged upstanding portions 26 serving to house the differential indicated at 27 and to constitute a central support for the independent rear wheel suspension system designated by the letters RS and shown schematically by dot and dash lines.

The cross sections of the frame members 11, 12, 13, 14, 16, 17, 18 and 19 may be as shown in Figures 5a—5e, respectively, of simple channel section 31; of channel section 32 closed by a a cover plate 33 to present a box section structure; of channel section 34 flanged as at 35; of semi-circular section 36, flanged as at 37 (and if desired closed by a cover plate, not shown), or of inwardly facing sections as 38, abutting and joined in their flanges 39 to present a closed structure.

The contouring of the side frame members is such as to constitute the chassis frame a closed substantially polygonal figure which is strongly resistant to torsion and with the transverse bracing members the chassis frame presents a plurality of interconnected triangulated structures.

By referring to the diagrams of Figures 6a—6k the different combinations of side frame members and transverse members to present the closed substantially polygonal figures can be appreciated very readily.

Furthermore the contour of the chassis frame side members may be such that the body can be placed on, and secured directly to, said side frame members and the body will preferably be reinforced rearwardly of the rear transverse bracing member to be self supporting in that portion overhanging rearwarly the chassis frame. The motor may be mounted with the forward transverse bracing members serving as a principal support therefor.

It will be clear from the foregoing that there is provided a chassis frame structure which is simple and, due to its triangulated structure is rigid, not requiring for this rigidity heavy sections of frame members, and one which lends itself very readily to the use of independent wheel suspension systems.

I claim:—

1. An underframe for vehicles comprising side frame members and transverse bracing, the side frame members conforming generally over a substantial portion of their length to the lower side margins of the body to be supported thereby and at least one of their ends being directed inwardly to meet in the longitudinal median plane of the underframe and to form obtuse angles with the main lengths of the side frame members, a member of said transverse bracing interconnecting the side frame members at the apices of said obtuse angles to form with the inwardly directed portions a truly triangulated structure strongly resistant to torsion, the junction of said inwardly directed side frame members providing an anchorage for an independent wheel suspension.

2. An underframe for vehicles comprising side frame members and transverse bracing members, the side frame members conforming generally over a substantial portion of their length to the lower side margins of the body to be supported thereby and having their forward and rearward ends directed inwardly to meet in the longitudinal median plane of the underframe and at one end at least these inwardly directed portions forming obtuse angles with the main lengths of the side frame members, certain of said transverse bracing members interconnecting the side frame members at the apices of said obtuse angles to form with these inwardly directed portions, truly triangulated structures strongly resistant to torsion, the meeting ends of said side frame members at one end of the underframe being joined to provide an anchorage for an independent wheel suspension, the transverse member forming the triangulated structure at the other end of the underframe providing anchorage for an independent wheel suspension at that end of the underframe.

WILLIAM SWALLOW.